(No Model.)
E. F. BARNES.
CUTTER HEAD.
No. 338,695. Patented Mar. 30, 1886.
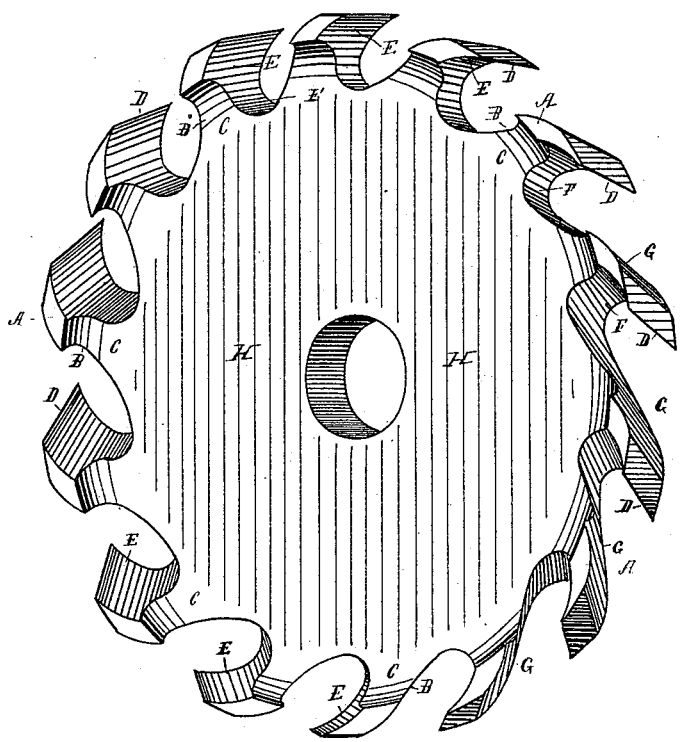
WITNESSES:
INVENTOR
BY
ATTORNEY

UNITED STATES PATENT OFFICE.

ELBRIDGE F. BARNES, OF NEW HAVEN, CONNECTICUT.

CUTTER-HEAD.

SPECIFICATION forming part of Letters Patent No. 338,695, dated March 30, 1886.

Application filed June 5, 1885. Serial No. 167,768. (No model.)

*To all whom it may concern:*

Be it known that I, ELBRIDGE F. BARNES, residing at New Haven, in the county of New Haven and State of Connecticut, have invented certain new and useful Improvements in Cutters for Wood-Working Machines; and I do declare the following to be a full, clear, and exact description of the same, reference being had to the accompanying drawing, which forms a part of this specification.

My invention relates to an improvement in cutters for wood-working machines, the object being to produce an effective cutter for hand or foot power or other slow-running machines.

With these ends in view my invention consists in a cutter provided with practically bottomless teeth formed by undercutting their necks.

My invention further consists in a cutter provided with practically bottomless teeth, and having certain details of construction, as will be hereinafter described, and pointed out in the claims.

The accompanying drawing is a perspective view of a cutter embodying my invention.

As herein shown, the teeth A are quite close together, and are made practically bottomless by undercutting their necks B, as at C, thus leaving the teeth overhanging on one side of the disk or body H, by which they are carried. The teeth are provided with beveled, flat, or chisel-shaped cutting-edges D, which are inclined relative to their line of movement or axis of rotation, so as to operate with a draw cut, and the under front walls, E, of the teeth are curved, so as to merge into the curved bottom walls, F, thereof. The cutting-edges D, the curved walls E and F, and the outer walls, G, of the teeth are inclined toward the undercutting or overhanging sides thereof. The body portion H of the cutter, on the undercutting side thereof, (or on that side on which the teeth are overhanging by reason of the undercut portions C,) is in a plane with the bottoms of the said overhanging portions of the teeth, or, in other words, is even with the said undercut portions C, while on the opposite side of the cutter the said disk or body is flush with the teeth.

By undercutting the necks of the teeth as shown, a free and ready clearance is secured, and this result is aided by the curved under walls of the teeth, which roll the waste fibers, whereby they are prevented from packing, and by the inclination of the lines of the teeth toward the undercutting, whereby direction is given to the waste fibers and their discharge facilitated.

By forming the teeth of the cutter as shown and described they may be located closely together, as required for clean cutting when the cutter is driven at a low rate of speed, and yet clear perfectly.

Cutters embodying my invention may be adapted to different forms of work for which cutters are used by suitably conforming the shape of the teeth to the work, and this may be done without departing from my invention.

As herein shown, the teeth of the cutter are made in one piece with the body thereof. If desired, however, the teeth may be made independent of and set into or otherwise secured to the body. As herein shown, also, the teeth are cut away only on one side; but they may be cut away on both sides.

As before stated, my improved cutter is designed for a hand or foot power or other slow-running machine, such as my patented machine patented to me under Letters Patent of the United States numbered 219,139, and bearing date as of June 7, 1879, with which patented machine I may use the cutter in place of the saw.

If desired, the cutter may be used in combination with a power-machine, in which case it would be driven at a higher speed, and might therefore be made with fewer teeth. I would therefore have it understood that I do not limit myself to the exact construction shown and described, but hold myself at liberty to make such changes and alterations as fairly fall within the spirit and scope of my invention.

I am aware that it is not new to form a cutter-head with overhanging teeth, and I do not claim such a construction, broadly; but the prior devices of this character were not capable of cutting so easily or of clearing themselves so readily as mine does, for the reason that the teeth thereof did not have the curved and inclined under front walls and inclined or draw cutting-edges.

Having fully described my invention, what I claim as new, and desire to secure by Letters Patent, is—

1. A cutter for wood-working machines, having an annular series of teeth which are undercut or overhanging on one side thereof, said teeth having curved and inclined under or front walls and inclined or draw cutting-edges, substantially as set forth.

2. A cutter for wood-working machines, made in one piece and having an annular series of inclined or draw cutting-teeth which are undercut or overhanging on one side of said cutter, and which are provided with curved and inclined front walls, the body portion of the cutter on the side thereof on which the teeth overhang being on a plane or even with the bottoms of the overhanging portions, substantially as set forth.

In testimony whereof I have signed this specification in the presence of two subscribing witnesses.

ELBRIDGE F. BARNES.

Witnesses:
M. S. SEELY,
E. H. ROGERS.